United States Patent [19]

Auphan

[11] 4,430,883
[45] Feb. 14, 1984

[54] DEVICE FOR THE CALIBRATION OF AN ULTRASONIC TRANSDUCER

[75] Inventor: Michel J. Auphan, Paris, France

[73] Assignee: U.S. Philips Corporation, New York, N.Y.

[21] Appl. No.: 342,329

[22] Filed: Jan. 25, 1982

[30] Foreign Application Priority Data

Feb. 2, 1981 [FR] France ................................ 81 01935

[51] Int. Cl.³ ........................................... G01N 29/00
[52] U.S. Cl. ................................................. 73/1 DV
[58] Field of Search ........................ 73/1 DV; 367/13

[56] References Cited

PUBLICATIONS

Ultrasonic Transducer Analyzer, NASA Tech. Briefs, MFS-25410, p. 59, Spring 1981.

Primary Examiner—Stephen A. Kreitman
Attorney, Agent, or Firm—Robert T. Mayer; Bernard Franzblau

[57] ABSTRACT

A device for the calibration of an ultrasonic transducer includes a container (4) which are immersed a calibration transducer (1), a rigid flat body (2) which contacts the front of the transducer (1) by way of a bevelled edge so that the distribution of the ultrasonic velocities is not disturbed in any way, a rigid hemisphere (3) which projects from a first principal surface (8) of the body, and the transducer (5) to be calibrated. The transducer (5) is displaceable so that a beam of ultrasonic energy to be emitted or received by this transducer can pass through any point situated within or near the hemisphere (3).

4 Claims, 1 Drawing Figure

DEVICE FOR THE CALIBRATION OF AN ULTRASONIC TRANSDUCER

BACKGROUND OF THE INVENTION

This invention relates to a device for the calibration of an ultrasonic transducer by measurement of the reflection of plane ultrasonic waves from a rigid spherical target.

It has been assumed thus far that apparatus for the ultrasonic scanning of objects emit powers which are sufficiently low to ensure that the patients are not endangered in medical echography. In order to achieve better control in this respect (contemporary apparatus often comprise a network of transducers instead of a single transducer) and to enable in general more accurate adjustment of apparatus for the formation of images of an object by ultrasonic scanning, it is increasingly important to provide accurate calibration methods for the transducer (transducers) incorporated in this apparatus.

The paper "Calibration of imaging systems by means of spherical targets" by M. Auphan, R. H. Coursant and C. Mequio at the tenth "Symposium International d'Imagerie Medicale", held in Cannes, France, from Oct. 12 to 16, 1980, clearly states the drawbacks of the customary methods. This paper, moreover, proposes a new calibration method for transducers where the ultrasonic pressure is determined on the basis of calculations which are based on the echos received after reflection from a small, rigid sphere which is struck by the waves emitted by the transducer.

A calibration method utilizing a spherical target has already been described in the article "Reflection of a plane impulsive acoustic pressure wave by a rigid sphere" by M. Auphan and J. Matthys, published in the magazine "Journal of Sound and Vibration", 1979, 66-2, pages 227 to 237.

However, it has been found that even the finest suspension wire for the spherical target produces echos which have an amplitude which cannot be ignored and which disturb the measurements and calculations of the useful echos. The proposed use of magnetic levitation means has been found to be very problematic in practice. It has also been proposed to intercept the echos which originate from a spherical target during its free fall in the liquid medium for the propagation of the ultrasonic waves. The apparatus for this method comprises a system for retaining the sphere which is released at a desired instant by means of a small electric motor and which reflects echos to the transducer during its free fall, the transducer emitting brief pulses having a repetition frequency of approximately 1 kHz. During the fall, the time interval between the instant at which the sphere is struck by the wave and the reception of the corresponding echo becomes smaller. A comparison device which detects the duration of this time interval activates an oscilloscope which comprises a memory at the instant at which the traject of the sphere intersects the axis of the transducer, the signals thus recorded being subsequently subjected to the calculations elaborated in said publications. However, it is a drawback of this method that a significant uncertainty remains as regards the actual position of the sphere. This is because the opening of the device whereby the sphere is retained can induce turbulences in the liquid medium for the propagation of the ultrasonic waves. Such turbulences are large enough to cause a deflection of the sphere so that the traject of the sphere is no longer the traject it would follow solely under the influence of gravity.

It is an object of the invention to provide a calibration device which simply solves the problem of suspending the sphere so that the solution involving a freely falling sphere can be abandoned.

SUMMARY OF THE INVENTION

To this end, the device in accordance with the invention is characterized in that it comprises:

(a) a flat ultrasonic calibration transducer;

(b) a rigid body which bears against the front of the calibration transducer by way of one of its edges and which comprises a first principal surface which extends perpendicular to said front and which is situated in a symmetry plane of this transducer;

(c) a rigid hemisphere whose equatorial plane coincides with the first principal surface of the body so that the hemisphere projects from the body and the centre of the sphere is situated on a symmetry axis of the calibration transducer;

(d) a container which is filled with a liquid in which the ultrasonic waves can propagate and in which the calibration transducer, the body and the hemisphere are immersed;

the ultrasonic transducer to be calibrated also being immersed in the container with its front facing the first principal surface of the body and being displaceable so that a beam of ultrasonic energy to be emitted or received by this transducer can pass through any point situated within or near the sphere.

Thus, a device is obtained which offers all the advantages of and is just as simple as a device comprising a sphere which is arranged to be stationary. However, it is important that the carrier of the hemispherical target, the body, be arranged so that the distribution of the ultrasonic velocities is not disturbed in any way. dr.

BRIEF DESCRIPTION OF THE DRAWING

The invention will be described in detail hereinafter with reference to the drawing which shows an embodiment of the calibration device in accordance with the invention.

DESCRIPTION OF THE PREFERRED EMBODIMENT

Figure 1:
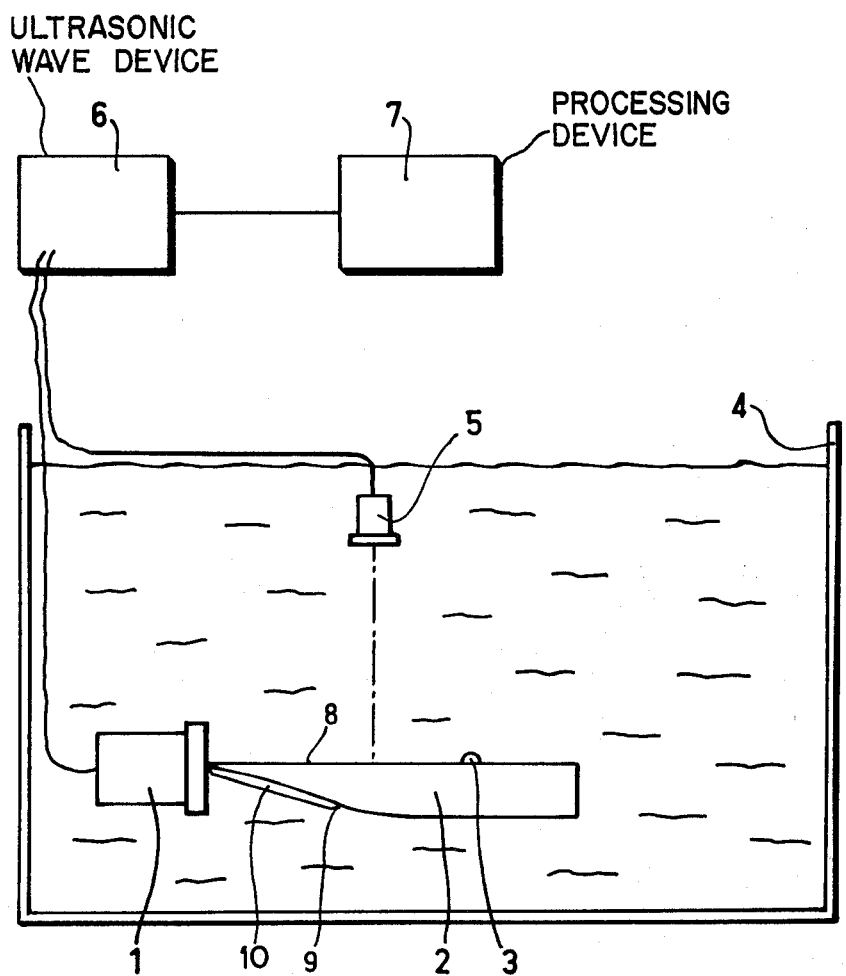

The device comprises a flat ultrasonic calibration transducer 1 whose surface area is large enough to enable division of a pulse emitted by this transducer into two separate successive pulses, the first pulse corresponding to the central zone of the transducer 1 and being comparable with a plane wave emitted by an infinitely flat transducer. The second pulse corresponds to the peripheral zone of this transducer. The device also comprises a rigid flat body 2, one of the edges of which bears against the front of the calibration transducer. The body 2 comprises a first principal surface 8 which extends perpendicularly to said front in a symmetry plane of the calibration transducer 1. The body 2 is arranged and shaped so that it does not disturb the distribution of the ultrasonic velocities of said plane wave emitted by the central zone of the calibration transducer 1. The body 2 furthermore comprises a second principal surface 9 which is situated opposite the first principal surface 8 and which is substantially tangent to the first principal surface 8 at the side of the calibration transducer 1 so that it encloses an acute angle with respect to said first principal surface. Consequently, the lowermost portion of the body 2 terminates into an extremely thin bevelled edge at the side of the calibration transducer 1, the bevelled portion being wider as the distance from the transducer increases. Such a configuration improves the ultrasonic isolation between the wave propagations on both sides of the body 2, thus preventing the return of the waves to the calibration transducer 1 that the wave propagation over the body is disturbed. This isolation can be improved, if desirable, by covering the second principal surface 9 with a material 10 which absorbs ultrasonic waves.

A hemisphere 3 projects from the body 2 and has an equatorial plane that coincides with the first principal surface 8. The center of the sphere is situated on a symmetry axis of the calibration transducer 1. The hemisphere 3 may be formed, for example, by a sphere 3 which is sunk into the body 2 as far as its equatorial plane. Because the half-spaces situated on either side of the body 2 are independent of one another, the same result can be obtained by arranging a hemisphere on the first principal surface 8. The hemisphere 3 is made of a material which is rigid in comparison with the surrounding medium in which the ultrasonic waves propagate, thereby simplifying the calculations on the basis of the measurement results obtained during the calibration.

The assembly formed by the calibration transducer 1, the body 2 and the hemisphere 3 is immersed in a container 4 which is filled with a liquid which has a low viscosity at the temperature at which the calibration device is used, for example, water. A transducer 5 (the transducer to be calibrated) is also arranged in the container. The front sides of the transducer 5 to be calibrated and the calibrations transducer 1 are perpendicular in the present case. The transducer 5, whose front faces the first principal surface 8 of the body 2, is displaceable so that a beam of ultrasonic energy to be emitted or received by this transducer can pass through any point situated within or near the sphere 3. The transducers 1 and 5 are connected to a device 6 for the emission and reception of ultrasonic waves which is connected to a device 7 for the processing of the measurement results.

The calibration method itself will not be described in detail because the invention does not directly relate thereto and because, moreover, the method has already been described in said paper, notably in the section "Solution as a series in the time domain", pages 4 to 6. It is merely to be noted that this method utilizes Taylor's series expansions around the hemisphere 3. Only a limited number of terms of said expansions are used, said number being smaller as the sphere is smaller (in practice, the diameter of the sphere is at the most eleven times larger than the wavelength of the ultrasonic signals). Examination of these expansions reveals that in general merely three terms have to be determined, one of which even equals zero when the surfaces of the transducers 1 and 5 are perpendicular as in the present embodiment. In the latter case, it is merely necessary to perform four ultrasonic pressure measurements for the determination of these two terms: (a) a first measurement where the calibration transducer 1 emits and receives the echos reflected thereto by the sphere 3; (b) three measurements during which the z-axis extends perpendicularly to the surface of the calibration transducer 1 and the transducer 5 to be calibrated emits in three positions (xo, yo, zo), (xo, yo, zo+dz) (xo, yo, zo−dz) which are very near to one another, the calibration transducer 1 then receiving the echos reflected thereto by the hemisphere 3. The results of the four measurements are processed by the processing device 7.

Finally, it is to be noted that the use of a liquid having a low viscosity simplifies the calculations. However, if this condition is not satisfied, the viscosity can in any case be simulated in the calculations.

What is claimed is:

1. A device for the calibration of an ultrasonic transducer by measurement of the reflection of plane ultrasonic waves from a rigid spherical target, comprising:
   (a) a flat ultrasonic calibration transducer;
   (b) a rigid body having one edge which bears against the front of the calibration transducer and which comprises a first principal surface which extends perpendicularly to said front and which is situated in a symmetry plane of the transducer;
   (c) a rigid hemisphere whose equatorial plane coincides with the first principal surface of the body so that the hemisphere projects from the body and with the centre of the sphere situated on a symmetry axis of the calibration transducer;
   (d) a container filled with a liquid in which ultrasonic waves can propagate and in which the calibration transducer, the body and the hemisphere are immersed;
   the ultrasonic transducer to be calibrated also being immersed in the container so that its front faces the first principal surface of the body, and being displaceable so that a beam of ultrasonic energy to be emitted or received by said transducer can pass through any point situated within or near the hemisphere.

2. A device as claimed in claim 1, wherein a second principal surface of the body is situated opposite the first principal surface of the body and is substantially tangent to the first principal surface at the side of the calibration transducer and encloses an acute angle with respect to the first principal surface.

3. A calibration device as claimed in claim 2, wherein the second principal surface of the body is covered with a material which absorbs ultrasonic waves.

4. A calibration device as claimed in any one of claims 1 to 3, wherein the surfaces of the front sides of the transducer to be calibrated and the calibration transducer are perpendicular.

* * * * *